May 11, 1926.

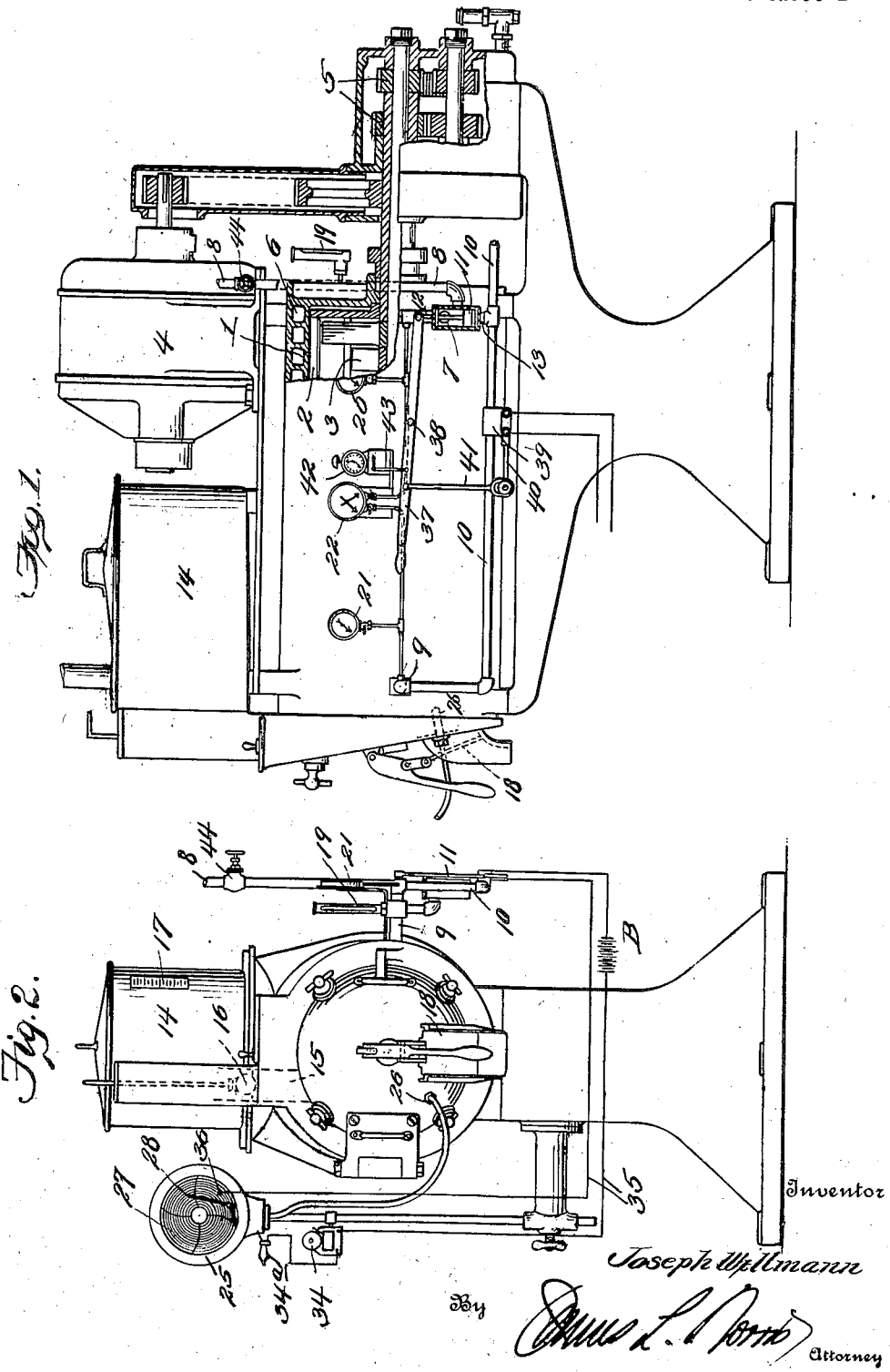

J. WILLMANN 1,584,580

METHOD OF AND APPARATUS FOR MAKING ICE CREAM

Filed March 8, 1922    2 Sheets-Sheet 2

Inventor
Joseph Willmann

By [signature]
Attorney

Patented May 11, 1926.

1,584,580

UNITED STATES PATENT OFFICE.

JOSEPH WILLMANN, OF DERBY, CONNECTICUT.

METHOD OF AND APPARATUS FOR MAKING ICE CREAM.

Application filed March 8, 1922. Serial No. 542,048.

My present invention relates to improvements in the art of making ice cream, and it primary object is to enable the maximum yield of ice cream of smooth texture, to be produced quickly and uniformly from a given volume or weight of mixture, thereby insuring maximum economy and uniform quality in the manufacture thereof.

Heretofore, ice cream has been generally manufactured commercially in brine or direct expansion ice cream freezers which usually embody a cylinder to receive the mixture, the wall of the cylinder being exteriorly jacketed for the circulation of the brine or cooling medium, and a dasher and scraper revoluble in reverse directions within the cylinder to agitate the mixture during freezing thereof, the scraper also acting to remove and thus prevent freezing of the mixture to the inside wall of the cylinder to any substantial extent. The temperature of the brine used ordinarily varies between minus 10° F. and plus 15° F.

Ice cream as ordinarily manufactured is an emulsion of liquid and air, the liquid consisting usually of a mixture of cream, condensed milk, sugar, gelatine and extract When this liquid is cooled to a temperature below its freezing point while being vigorously agitated, the watery content of the liquid, which constitutes ordinarily about 60% thereof, is frozen into an amorphous mass which appears to be smooth and creamy, although it would ordinarily freeze into a solid mass at the temperature to which it is cooled, had it been so cooled without agitation. The viscosity of this undercooled creamy mass endows it with the property of picking up or entraining air within it while undergoing agitation through the action of the scraper and dasher, thereby causing it to swell or increase its volume, it being possible to obtain a product having double the volume of the mixture originally used, the air content representing about 50% of the finished product, having been emulsified into and with the mixture by the violent agitation taking place during the whipping and cooling of the mass.

However, the commercial manufacture of ice cream, as heretofore practiced, has been largely a matter of guess-work on the part of the operator, successful results depending largely on the skill and experience of the operator and the yield obtained from each batch of mixture being variable and uncertain in amount and also lacking uniformity in quality, due primarily to the fact that the operator has not been able to determine and control properly the conditions which must be observed in order to always produce the best results. For example, cream can be easily and quickly whipped in an ice cream freezer at a temperature of 50° to 55° F., but if the whipping action were prolonged for only a short time beyond a given period, the working of the scraper and dasher would break down the cream into butter and butter milk and also eliminate the particles of air which had been emulsified with and minutely distributed through the mass by the former part of the whipping action. Therefore, it is necessary to cool the mixture as quickly as possible to a temperature below the freezing point, in order to prevent churning and the consequent formation of butter. Also, the most favorable freezing temperature to be used, the relation between the temperature of the brine or cooling medium and the active pressure head thereof to be observed. the variation in the freezing temperature due to variations in the sugar content of the mixture, the rapidity with which the mixture should be cooled to the freezing temperature in order, on the one hand, to avoid churning action, and on the other hand, to avoid forming a coarse rough product to maintain such freezing temperature, and the duration of the whipping period necessary to produce a yield of maximum volume and smooth uniform quality and to avoid churning action have not been heretofore known or observed generally or uniformly in the usual manufacture of ice cream. The present invention enables these various conditions to be determined and to be known and observed uniformly by the operator, in consequence of which the operator, although he may be unskilled, can produce a smooth, high grade and uniform quality of ice cream possessing the maximum amount of swell or volumetric increase over the volume of mixture used. The invention can be carried out in connection with brine ice cream freezers or direct expansion ice cream freezers of any of the usual or well known types employing a freezing cylinder with surrounding brine or cooling jacket and containing reversely revoluble scraper and dasher. As an example, in the accompanying drawings:—

Figure 1 is a side elevation of one well known type of brine ice cream freezer to which the present invention is applicable;

Figure 2 is an end elevation of the freezer shown in Figure 1;

Figure 3:
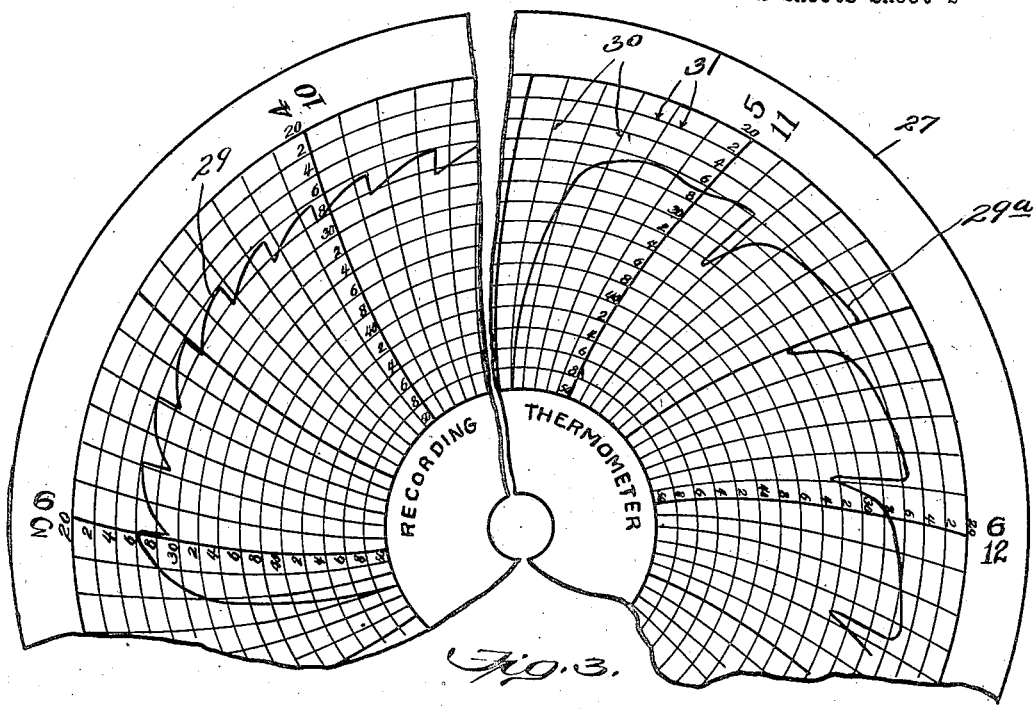
Figure 4:
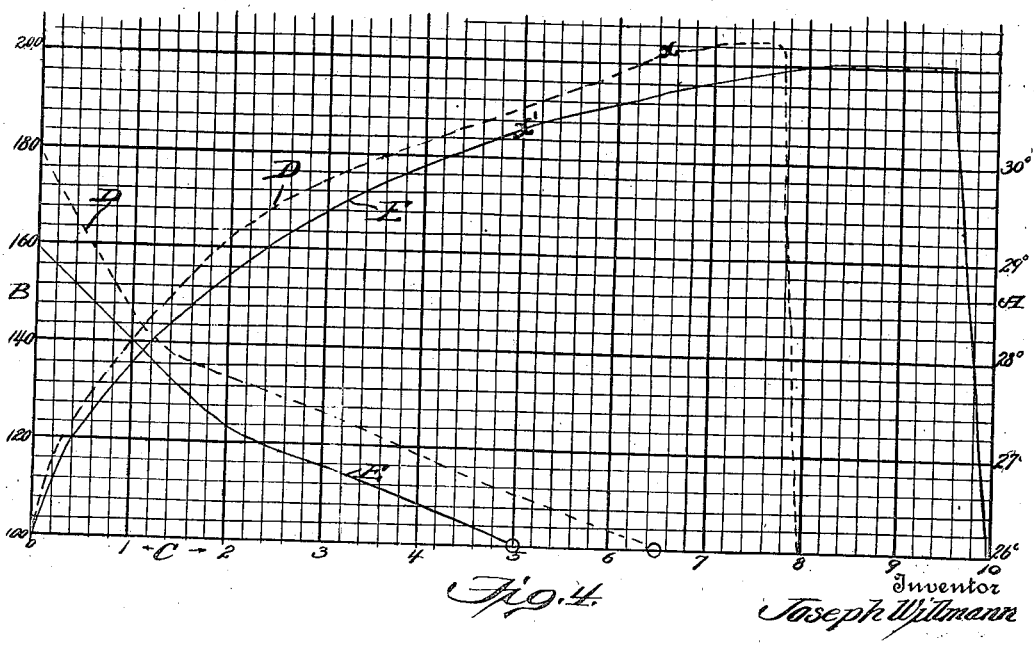

Figure 3 represents portions of indicator cards showing the temperature and time factors existing during the manufacture of ice cream in accordance with the present invention, using two different types of brine ice cream freezer; and Figure 4 is a diagram showing the interrelation to be observed between the synchronized cooling and whipping actions in two different types of brine ice cream freezers to obtain a product having the proper texture and the desired yield.

As shown, the ice cream freezer comprises an inner cylinder 1 to contain the mixture to be whipped and frozen, this cylinder containing a scraper 2 and a dasher 3, the scraper and dasher being simultaneously revolved usually at a constant speed but in reverse directions by suitable means such as an electric motor 4 and appropriate gearing 5. The inner cylinder is surrounded by a jacket for the circulation of brine, ammonia or other suitable cooling medium, the jacket being generally in the form of a coil 6 which is wound helically around the outside of the cylinder and has a brine inlet 7 which is connected to a brine-supply pipe 8 and an outlet 9 which is connected to a brine return pipe 10. A brine control valve 11 is provided which is preferably of the quick-opening type, that shown being so constructed that when its stem 12 is lowered, brine or other cooling medium flows from the supply pipe 8 into the inlet 7 and thence circulates through the coil 6, thence discharging through the outlet 9 into the return pipe 10; and when the stem 12 is raised, the supply of brine to the inlet 7 will be cut off and will by-pass to the return pipe 10 through the by-passage 13.

The ice cream mixture, in liquid form, is conducted to a supply-tank 14 which may be conveniently located above the freezer and provided with a conduit 15 through which the mixture may flow into the cylinder of the freezer. A valve 16 is generally provided to enable the operator to charge the freezer cylinder at the proper times, and it is preferable to also provide suitable means for determining the weight or volume of each charge or batch of mixture introduced into the freezer cylinder. For example, the supply tank may be provided with a suitably graduated scale 17 to indicate the volume of mixture drawn from the supply tank to make up each batch in the freezer cylinder. The finished product is usually discharged from the freezer through an outlet valve or gate 18, the product at this time being sufficiently fluid to enable its discharge in such manner, and the product may be placed in cans or other suitable receptacles and frozen solid in a cold storage room, as is commonly done in the commercial manufacture of ice cream. It is to be understood that the mixture is introduced into the freezer cylinder while the scraper and dasher are revolving, and the finished product discharged at the end of the freezing operation.

In the operation of ice cream freezers of this general class, the actions taking place within the freezer and the mixture under treatment, are First, the mixture is whipped and concurrently cooled to the freezing point of the mixture corresponding to the sugar content thereof, whereby the sensible heat of the mixture is removed through the action of the brine cooling medium and the scraper and dasher; and Second, the mixture is whipped and concurrently cooled to a temperature below the said freezing point, whereby the latent heat of the watery part of the mixture, and which constitutes about 60% thereof, is removed, and bubbles of air of minute size are mixed and thus emulsified with the mixture to form a product having the necessary smoothness in texture and the desired swell or increase in volume.

Of these two phases in the making of ice cream, the second is of most importance. If the mixture or batch is cooled too quickly, large crystals will form on the freezing surface and the mixture will pick up large air bubbles and hence the batch will swell too quickly and without forming minute air bubbles therein, and in consequence, the product would be rough and unfit for commercial use. Such a product could be treated by a skilled operator to break up and thus finely divide the air bubbles and liquid, by shutting off the brine or cooling medium and continuing the operation of the scraper and dasher until the heat generated by the energy spent in driving the same raises the temperature of the mixture, which was too quickly and unduly cooled, to a point where a fine emulsion may be formed. Such a procedure, however, could be performed only by a skilled operator, and in any case, it would involve a loss of time and the results would be more or less uncertain because of the great care required.

The present invention enables ice cream of uniformly high quality and possessing the desired amount of swell to be produced without depending on the skill of the operator, it insuring the observance of the most favorable temperature and time factors, and in particular, the proper moment to cut off the supply of brine or cooling medium, this depending upon when the mixture has been cooled to a temperature within the relatively narrow zone most favorable for the freezing of the particular mixture used, while being whipped at a rate corresponding to the rate at which the temperature is lowered.

In carrying out the invention, the procedure is preferably as follows:

As a preliminary, the temperature zone most favorable for the freezing and whipping of the particular mixture used in each plant is first determined. This temperature is chiefly dependent on the sugar content of the mixture, the freezing temperature being lowered as the sugar content is increased. The freezing temperature zone of each mixture used in each plant may be easily and quickly determined in each instance, and when once determined, may be used as a basis for all ice cream manufactured from a mixture having such a sugar content.

The next preliminary step is to determine the period of time required to cool the mixture or batch introduced into the freezing cylinder down to the freezing temperature of the particular mixture used, with a rapidity which will produce the desired swell and at the same time will form a smooth product. The period of time required to do this will depend somewhat on the structural characteristics of the freezer, such for example, as the circulating arrangements for the brine or cooling agent, the area of the cooling surface, the character of the scraper and its efficiency in keeping the cooling surface clean of frozen product, and the character of the dasher and the rapidity with which it forms an air and liquid emulsion and subdivides the air constituent thereof. These factors, however, are substantially constant and, hence, when once determined for a freezer of a given type may be taken as a basis for all freezers of the same type. The most important factors which it is necessary to determine, and which usually vary in different plants, comprise the temperature of the brine or cooling agent supplied to the cooling jacket and the amount of brine passing therethrough in a given unit of time.

The temperature of the brine used may vary in different plants from minus 10° up to plus 15° F. and in order to determine the temperature of the brine going into the cooling jacket of the freezing cylinder, a thermometer 19 is preferably fitted thereto at or in immediate proximity to the brine inlet of the jacket. The rapidity of the cooling action will depend on the temperature of the brine entering the cooling jacket and the volume of brine passing through the jacket in a given unit of time provided the cooling surface is kept clean; and this volume of brine will be determined by the active pressure head of the brine; that is to say, the excess in brine pressure at the inlet over its pressure at the outlet of the cooling jacket. To enable this difference in pressure, and in consequence, the active pressure head of the brine to be determined, the freezer may be equipped with a pair of pressure gages 20 and 21, the former being connected to show the pressure of the brine at the brine inlet of the cooling jacket and the latter being connected to show the pressure at the outlet of the jacket, the difference in these two pressures representing the active pressure head; or a differential pressure gage 22 may be connected to the brine inlet and outlet, this gage indicating directly the difference in pressure at these two points and hence the active pressure head of the brine which determines the volume of brine passing through the cooling jacket in a given unit of time.

The active pressure head of the brine is adjusted to bring it into conformity with the temperature of the brine entering the jacket, by appropriately limiting the extent of opening permitted the brine supply valve 44. When this valve is once set to produce the proper active pressure head, no further adjustment thereof should be necessary, because the brine pumps generally used in ice cream plants ordinarily produce substantially constant pressure.

In order to assist in determining when the most favorable freezing temperature has been attained during two or three preliminary runs that may be made for this purpose; to provide a guide for the operator to follow in order to keep the temperature within the freezing cylinder at a proper point during the freezing operation, and also to enable the temperature used to be checked during any operation of the machine, a thermometer is provided which responds to and indicates the actual temperature of the mixture within the freezing cylinder. An ordinary thermometer could be used and this thermometer could have marked thereon the proper temperature zone to be observed. It is preferable, however, to employ a recording thermometer which will provide a record of the temperature and time factors which actually existed during each run of the freezer. A recording thermometer 25 is shown in the present instance which may be of any well known type, the bulb or tube 26 thereof projecting into the freezing cylinder so that it will be under the direct temperature influence of the mixture or batch contained therein, and the thermometer bulb is preferably located below the mixture inlet 15 and hence in the path of the relatively warm incoming mixture so that heat insulating frosting that may form on the bulb will be removed by melting, and a clock-motor driven dial is adapted to receive a card 27 such as that shown in Figure 3, the pen or marker 28 indicating by a line 29 or 29ᵃ on the card the actual temperature of the mixture within the freezing cylinder at any time during the operation of the freezer. For this purpose, the indicator card 27 is subdivided circumferentially by the lines 30 which represent units of time and the series of intersecting lines 31 which represent degrees of temperature, the relation between the line 29 or 29ª marked on the card by the pen and the lines 30 and 31 indicating the temperature existing at any given time. The lines made on the cards by the recording thermometer obviously provide records which show the temperature and time factors existing during the run on each batch of the mixture, and also during any phase or stage of each run.

A very important step in the operation is to cut off the supply of brine or cooling agent at the precise moment when the mixture or batch in the freezing cylinder has been cooled down to the most favorable freezing zone and the whipping synchronized therewith has progressed to the proper extent. In order to insure this, an alarm or signal device is preferably provided which is operative automatically to notify the operator when the brine supply should be cut off. Preferably and as shown, an electric bell or audible signal 34 is provided, the circuit 35 of which includes a battery or other source of electric energy B and also a contact 36 which latter is arranged to be engaged by the arm of the pen 28 of the recording thermometer, or by a part actuated by the pen, at the moment when the favorable freezing zone has been reached. This alarm or signal, when it operates, indicates that the brine supply valve 11 must be closed, and to facilitate this operation, a lever 37 may be operatively connected to the stem 12 of the brine valve, the lever, as shown in the present instance, being pivotally mounted at 38. A visual signal, as for example, an electric lamp 34ª is preferably connected in the alarm circuit of each freezer to indicate which one in a row or group is giving the alarm or signal.

It is preferable to provide means to insure the closing of the brine supply valve at the moment indicated by the alarm 34 or to indicate that such valve has been closed in obedience to the signal given by the alarm. For this purpose, means is provided for interrupting the sounding or operation of the alarm when the brine supply valve is closed. As shown, an electric switch 39 is connected in the circuit 35 and has an arm or part 40 arranged to be operated by a link 41 connected to the lever 37, so that when the latter is actuated to close the brine supply valve, the switch will be opened, thus interrupting the operation of the audible alarm and also the visual signal. At the commencement of the next run, the movement of the lever 37 to open the brine supply valve will cause closing of the switch 39, thus preparing the audible alarm and visual signal for operation when the pen 28 of the recording thermometer again engages the alarm-controlling contact 36.

If the freezer were so operated that the favorable freezing zone was reached before the proper amount of air has been whipped into the mixture then the cream must be whipped after the brine has been shut off, and this whipping period must cover a definite time in order to enable the yield or swell desired by the manufacturer to be obtained. To insure reliable and uniform results in this regard, a clock 42 is preferably employed which is provided with an alarm, the alarm being set to commence the measurement of the whipping period by the operation of the lever 37 in a direction to close the brine supply valve, the clock being connected by a rod 43 to the lever 37 for this purpose, and when the whipping period for which the clock and alarm are set has expired, the alarm will sound or otherwise operate to notify the operator that the whipping operation has been completed and that the gate 18 be immediately opened to discharge the product from the freezing cylinder. By this arrangement, a substantially invariable over-run or whipping operation can be given each batch and hence the swell or yield of the product relatively to the volume of mixture used, will be substantially constant. The duration of the whipping period and also the temperature at which the whipping operation is performed will be indicated and recorded by the line marked on the card by the recording thermometer, and hence the recording thermometer may be used by the operator as a check to insure the proper performance of the whipping period and the card will provide a record by which the temperature and time factors existing during the whipping period of any run may be determined.

In making ice cream in accordance with the present invention, the procedure is substantially as follows: After the preliminary steps herein described have been taken to determine the most favorable freezing temperature zone for the mixture to be used and the brine supply valve has been set to produce the appropriate active pressure head for the particular temperature of the brine or cooling agent used in connection with the particular type of freezer employed, the successive runs on the different batches of mixture may be proceeded with.

First, a measured or other given volume of the mixture is introduced into the supply tank 14, the brine valve 11 is opened, the discharge gate 18 being then closed, and the valve 16 is opened to introduce the mixture from the supply tank 14 into the freezing cylinder. According to the record shown at the left-hand side of the card represented in Figure 3 and which has been taken from an actual run made with a quick-cooling brine freezer of a certain type, each filling of the freezing cylinder, (following the initial run) caused a sudden but slight rise in temperature, followed immediately by a gradual cooling of the mixture, during a period of about eight minutes, the mixture during this period being concurrently whipped. At the end of this period, the batch or mixture was synchronously cooled to the most favorable freezing temperature which was 26° and it was whipped in a manner and to the extent that the product was smooth in texture and the yield was increased to more than 200% of the volume of the mixture used. The product, which was then finished, was discharged from the freezing cylinder by opening the gate 18. The alarm, or signal, if set to operate when the favorable freezing temperature is reached, may be used to indicate that the batch is finished and should be discharged from the freezing cylinder.

According to a record shown on the right-hand side of the card represented in Figure 3 and which also has been taken from an actual practical run with a slow-acting brine freezer of a certain type, it will be observed that the filling of the freezing cylinder with the mixture, following a preceding run, caused a sudden rise in temperature, but the mixture was quickly cooled, as is indicated by the sharp bend in the line marked by the thermometer until the temperature reached a point below the freezing point, but several degrees above the most favorable freezing zone for the whipping of the mixture used which in this instance was about 26°. The curve then flattened substantially and the temperature continued to descend gradually, during a period of about 16 or 19 minutes, until the temperature of the mixture in the freezing cylinder had reached the favorable freezing temperature zone. At this moment the arm of the pen of the thermometer engaged the contact controlling the alarm or signal 34, and the latter in consequence is caused to sound or operate.

This alarm or signal indicates to the operator that the supply of brine should be cut off and this is done by suitably operating the lever 37. This operation of the lever 37 causes the switch 39 to open, thus interrupting the operation of the alarm or signal.

In this case a short whipping period follows the cutting off of the brine supply to get the smoothness in quality and the amount of swell or yield of the product desired, and when this period has been once determined for a given mixture and to suit the desires of the manufacturer, this period should be constant for each run in order to insure uniformity in the product. Where, as is shown in the present instance, a clock-motor alarm is used, this alarm will be set according to the length of the whipping period desired and the clock-motor of the alarm will be started by the movement of the lever 37 which closes the brine supply valve, and when the desired period for the whipping operation has expired, the alarm will sound or operate, thus notifying the operator that the whipping treatment is ended and that the valve or gate 18 should be opened to discharge the product from the freezing cylinder.

The freezer is then ready to receive another batch of the mixture and the run thereon will be conducted in exact accordance with the preceding run.

As mentioned above, if the brine control is correct as to flow and temperature, then the favorable freezing zone is reached at the moment when the yield is right and the product can be drawn from the freezer when the brine is shut off.

Figure 4 is a diagram showing the interrelationship between the syncnronous cooling of the mixture to the favorable freezing zone and the whipping of the mixture to produce the required smoothness in texture and the desired yield. In this diagram the scale A represent the temperature component in terms of degrees, B the yield in terms of percentage of volumetric increase as compared with the volume of the mixture used, and the scale C the time component in terms of minutes. The dotted lines D represent the curves corresponding to a run made with a quick cooling freezer which was completed in about 8 minutes. The favorable freezing zone was reached in about 6½ minutes, $x$ indicating the point at which the brine was cut off, at which time the yield was increased to slightly over 200 per cent, as compared with the original volume of the mixture used. The product was then finished and it was immediately discharged from the freezer cylinder. In this case the synchronous cooling and whipping actions were coordinated so that they terminated at substantially the same moment. The full lines E, Figure 4, represent the curve corresponding to a run also made with a quick cooling freezer which was completed in about 10 minutes. The favorable freezing zone was reached in about 5 minutes, the brine being cut off at the point $x'$, but at this time, the desired amount of yield had not been attained, owing to the unduly rapid cooling of the mixture and hence the whipping period was continued for about 3½ minutes when the desired yield was attained, whereupon the product was discharged from the freezing cylinder.

The present invention enables ice cream to be manufactured in accordance with the temperature and time factors which are most favorable to the production of ice cream or similar frozen products which will be uniformly smooth in quality and will possess the desired swell or yield relatively to the volume or amount of mixture used, it facilitates the method to the extent that successful and uniform results can be obtained without requiring a skilled operator, it enables the product to be obtained in a minimum period of time, the operator is furnished with information respecting the actual conditions existing at all phases of the method, and, moreover, records are made of all the runs made in the freezer so that the conditions which existed during all stages of each run can be subsequently ascertained.

I claim as my invention:—

1. The method of making ice cream which comprises cooling a batch of ice cream mixture to a temperature within the zone most favorable to the freezing of such mixture and concurrently whipping the batch, thereupon interrupting the cooling of the batch, and then continuing the whipping of the batch for a definite period of time while the temperature thereof is maintained within said zone.

2. The method of freezing ice-cream which consists in providing a quantity of ice-cream mix, passing a definite quantity of refrigerant into heat-interchanging relationship with the mix, said quantity being predetermined according to the composition of the mix and the temperature of the refrigerant, discontinuing the further passage of the refrigerant, and then whipping the mix.

3. The method of making ice-cream which comprises concurrently whipping a batch of ice-cream mixture and cooling the same to a temperature within a predetermined zone found to be most favorable to the freezing of such mixture, by circulating a refrigerant at a given temperature about such batch at such a predetermined active pressure head in relation to the temperature of the refrigerant as has been found will produce ice-cream of smooth quality and maximum yield from such mixture in the minimum time, interrupting the supply of the refrigerant when the temperature of the batch has been cooled to said favorable freezing zone, and then continuing the whipping of the batch while maintained at a temperature substantially within said freezing zone for a measured period of time which has been predetermined to produce the desired yield.

4. In combination with an ice-cream freezer embodying a freezing chamber and a jacket for the passage of a refrigerant, means operative to control the supply and interruption of the refrigerant with respect to said jacket, and means which is rendered operative by said refrigerant control means for determining when a batch of ice-cream mixture in the freezing chamber has been cooled to a predetermined temperature and said refrigerant control means should be operated to interrupt the supply of refrigerant.

5. In combination with an ice-cream freezer embodying a freezing chamber and a jacket for the passage of a refrigerating medium, means for controlling the supply of the refrigerating medium to said jacket, means responsive to the temperature of a batch of ice-cream mixture in the freezing chamber for determining when the controlling means for the refrigerating medium should be operated to interrupt the supply of refrigerating medium, and controlling means operatively connecting said refrigerating medium control means and said temperature responsive means.

6. In an ice-cream freezer embodying a freezing chamber and a jacket for the passage of a refrigerating medium, means for supplying a refrigerating medium to the inlet of said jacket and for conducting such medium from the outlet thereof, and means for establishing a predetermined differential pressure in said medium between the inlet and outlet of the jacket whereby the resulting rate of flow of the refrigerating medium in the jacket will produce a definite amount of cooling of a batch of ice-cream mixture in the freezing chamber in a given period of time.

7. The combination with an ice cream freezer having a freezing cylinder, means for circulating a cooling medium around the cylinder, and means for controlling the supply of cooling medium to the cylinder, of means responsive to the temperature condition existing in the mixture within the cylinder for indicating that a predetermined temperature has been reached, thus indicating that the controlling means for the cooling medium should be closed, and means operative by the closing of said controlling means for interrupting the operation of said indicating means.

8. In an ice cream freezer of the type employing a freezing cylinder and jacket for the circulation of a cooling medium, a by-pass valve between the inlet and outlet of the jacket for controlling the supply of cooling medium to the jacket, and a supply valve for determining the active pressure head on the cooling medium circulating through the jacket.

9. In an ice cream freezer of the type embodying a freezing cylinder and a jacket for the circulation of a cooling medium, means for determining the difference in pressures of the cooling medium at the inlet and the outlet of the jacket, and a valve for regulating said difference in pressures to obtain a predetermined active pressure head.

10. In an ice cream freezer of the type employing a freezing cylinder and a jacket for the circulation of a cooling medium, means for determining the temperature of the cooling medium at the inlet of said jacket, means for determining the difference in pressures of the cooling medium at the inlet and the outlet of the jacket, and means for regulating said difference in pressures to obtain a predetermined active pressure head in relation to the temperature of the cooling medium at the inlet of the jacket to produce a predetermined cooling action within a given time.

11. In an ice cream freezer of the type employing a freezing cylinder and a jacket for the circulation of a cooling medium, means for determining the actual temperature of an ice cream mixture within the freezing cylinder, means for determining the temperature of the cooling medium at the inlet of said jacket, means for determining the difference in the pressures of the cooling medium at the inlet and the outlet of the jacket, and means for regulating said difference in pressures to obtain an active pressure head in relation to the temperature of the cooling medium at the inlet of the jacket to produce a predetermined temperature within a given time in the mixture contained in the freezing cylinder.

12. The combination with an ice-cream freezer, of a thermometer operative to indicate when a predetermined freezing temperature of the mixture within the freezer has been reached, and a device operative to measure the duration of a subsequent whipping period and to indicate when such whipping period has expired.

13. The combination wth a brine ice-cream freezer having means for cutting off the supply of brine thereto, of a device set into operation by the actuation of said brine cut off means to measure the duration of the whipping period and operative to indicate when such period has expired.

14. The combination with an ice-cream freezer having means for supplying and cutting off the supply of a refrigerant thereto, of a device capable of being set for a desired period of time and having means for starting it into operation when the refrigerant supply is cut off to determine the duration of the whipping period following the cutting off of the refrigerant supply.

15. The method of freezing ice cream which consists in providing a quantity of ice cream mix, measuring a definite quantity of refrigerant, said quantity being predetermined according to the composition of the mix and the temperature of the refrigerant, passing said quantity into heat interchanging relationship with the mix, discontinuing the further passage of the refrigerant, and then whipping the mix.

In testimony whereof I have hereunto set my hand.

JOSEPH WILLMANN.